United States Patent [19]
Newby

[11] Patent Number: 5,662,459
[45] Date of Patent: Sep. 2, 1997

[54] PRESSURIZED GAS DRIVEN LIQUID PUMP HAVING THE OUTLET PIPE CONNECTED TO A VARIABLE BUOYANT FLOAT

[76] Inventor: John C. Newby, P.O. Box 989, Cobb, Calif. 95426

[21] Appl. No.: 565,917

[22] Filed: Dec. 1, 1995

[51] Int. Cl.$^6$ ................................................ F04B 53/00
[52] U.S. Cl. .............................. 417/61; 417/279; 417/126
[58] Field of Search ...................................... 417/118, 126, 417/137, 138, 279, 61

[56] References Cited

U.S. PATENT DOCUMENTS

| | | |
|---|---|---|
| 3,087,438 | 4/1963 | Ciesielski . |
| 3,285,001 | 11/1966 | Turnblade . |
| 3,898,017 | 8/1975 | Mandroian . |
| 3,902,825 | 9/1975 | Quillen . |
| 4,181,470 | 1/1980 | Gillett . |
| 4,469,472 | 9/1984 | Newby . |

Primary Examiner—Timothy Thorpe
Assistant Examiner—Peter G. Korytnyk

[57] ABSTRACT

A pump mechanism adapted to float on a reservoir of liquid characterized by a floating enclosure provided with an internal chamber, an open cycling container, disposed within the chamber, an output pipe coupled to the cycling container and coupled to a swivel joint, which is connected to the lower wall of the enclose. A pressurized gas and/or steam source inlet tube, allows pressurized gas to enter the chamber. The interplay between the force of gravity and the force of buoyancy activated by the force of an expanding gas and/or steam are the factors which cycle this device in a pumping action. In operation the cycle begins with the chamber full of liquid and the cycling container resting on the bottom of the chamber. The pressurized gas forces liquid out of the chamber through the pipe located within the cycling container. This continues until the pressure has emptied the cycling container. The pressurized gas will now vent through this pipe. The pressure of the reservoir water is now greater, a one way flapper valve opens and the chamber beans to refill. The buoyant cycling container rises as the chamber fills. The cycling container's vertical, circular arc path causes it to take in water at a predetermined point, here it sinks to the bottom of the chamber. The pressurized gas can no longer vent and the chamber pressure increases. The cycle repeats.

5 Claims, 4 Drawing Sheets

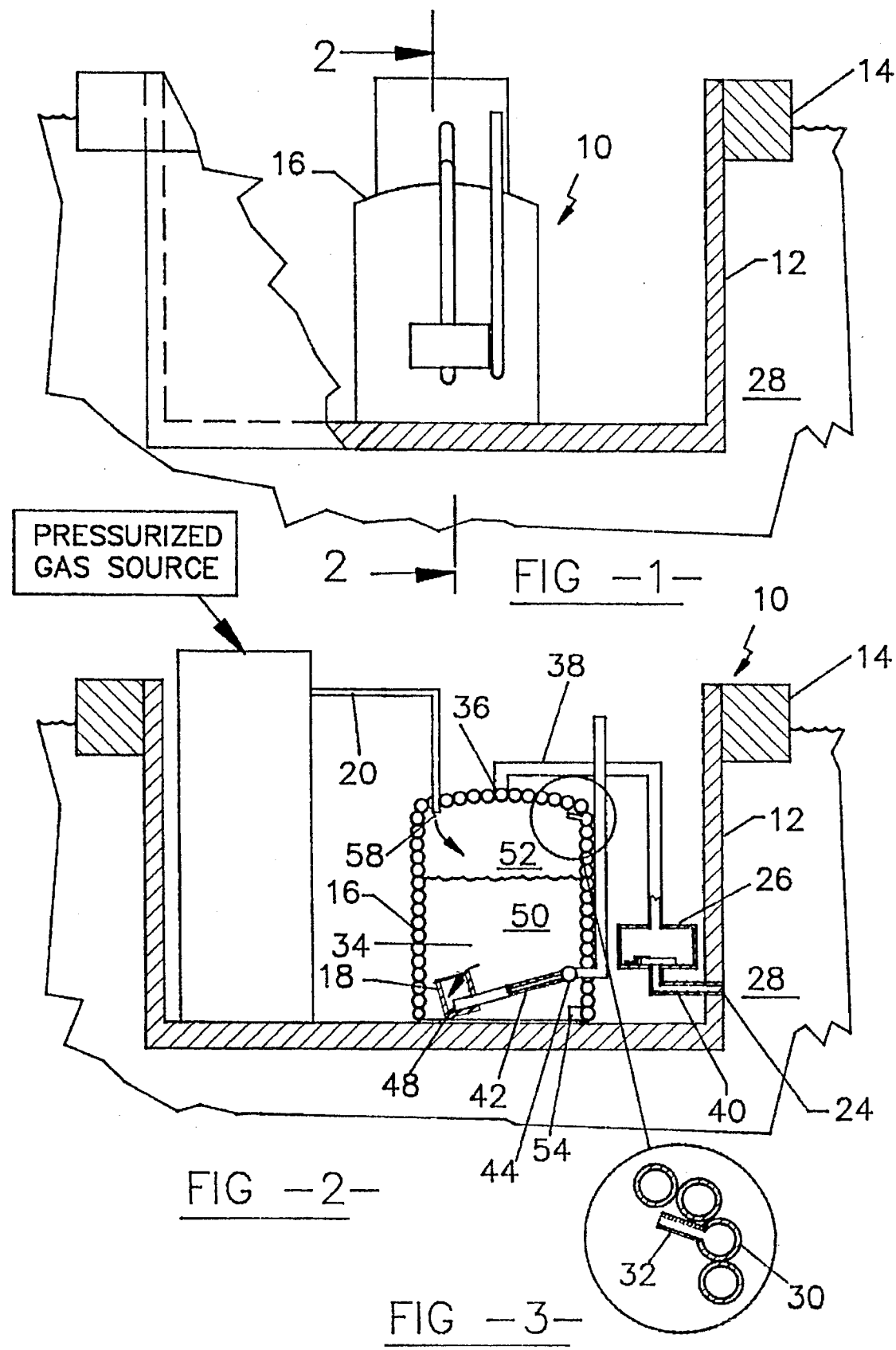

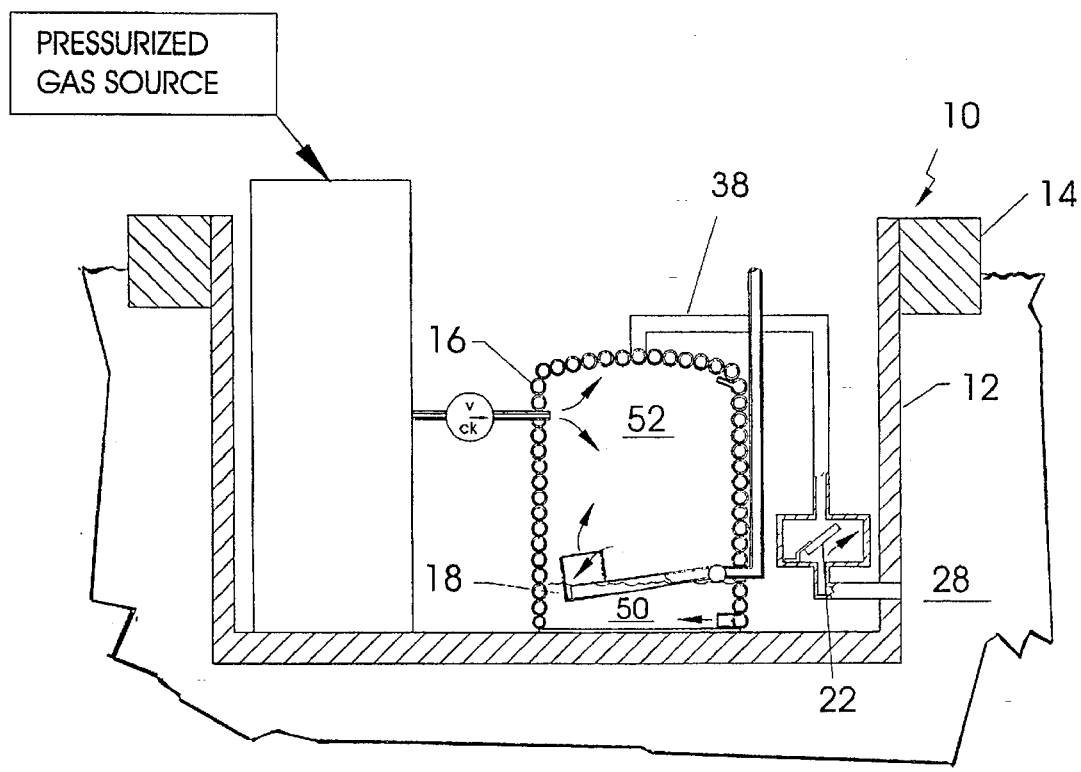
FIG -4-
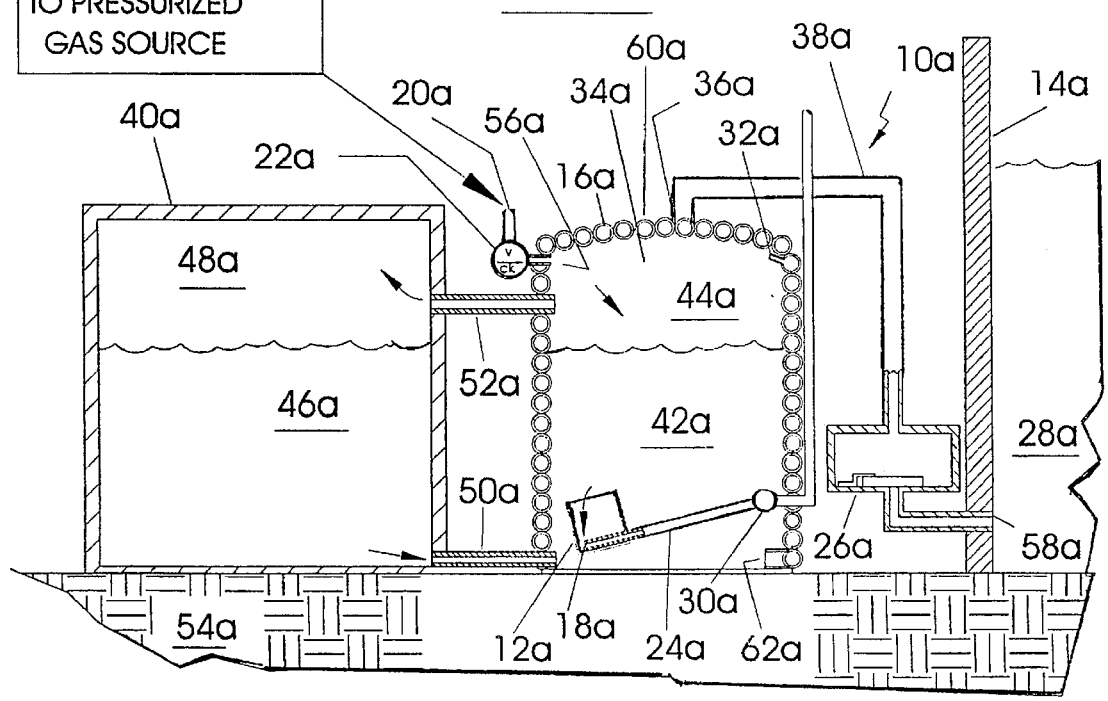
FIG -5-

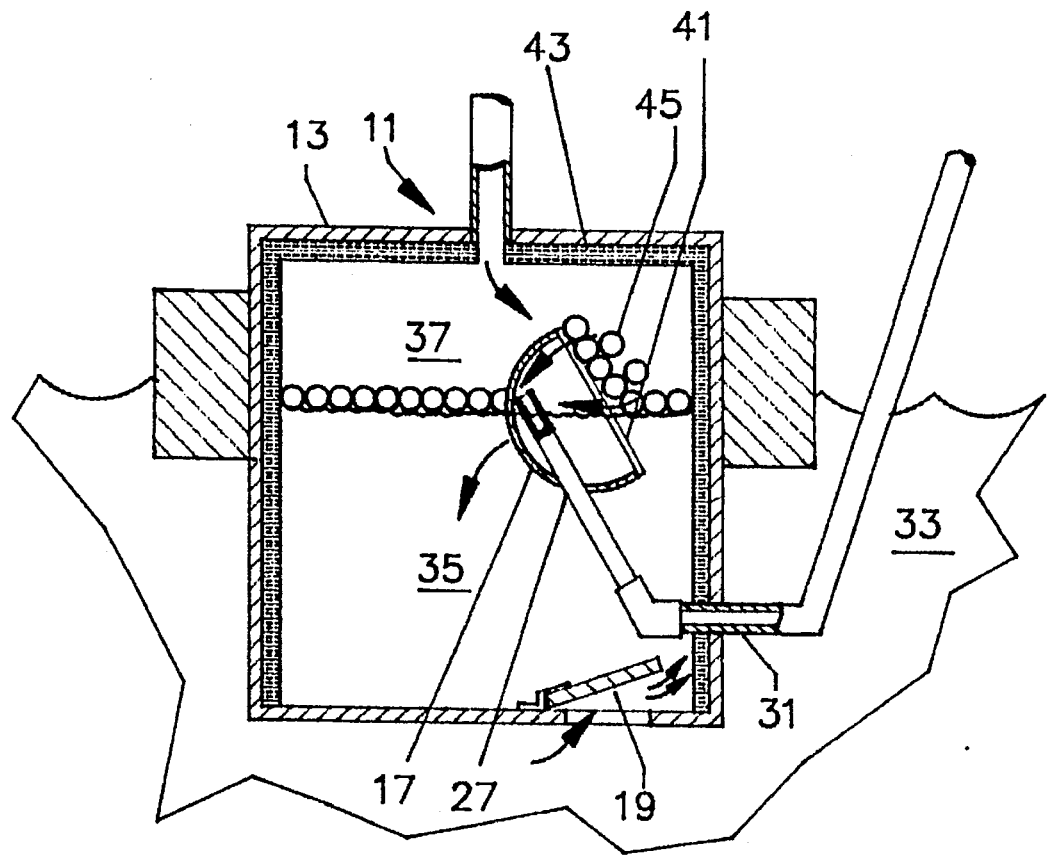
FIG -6-
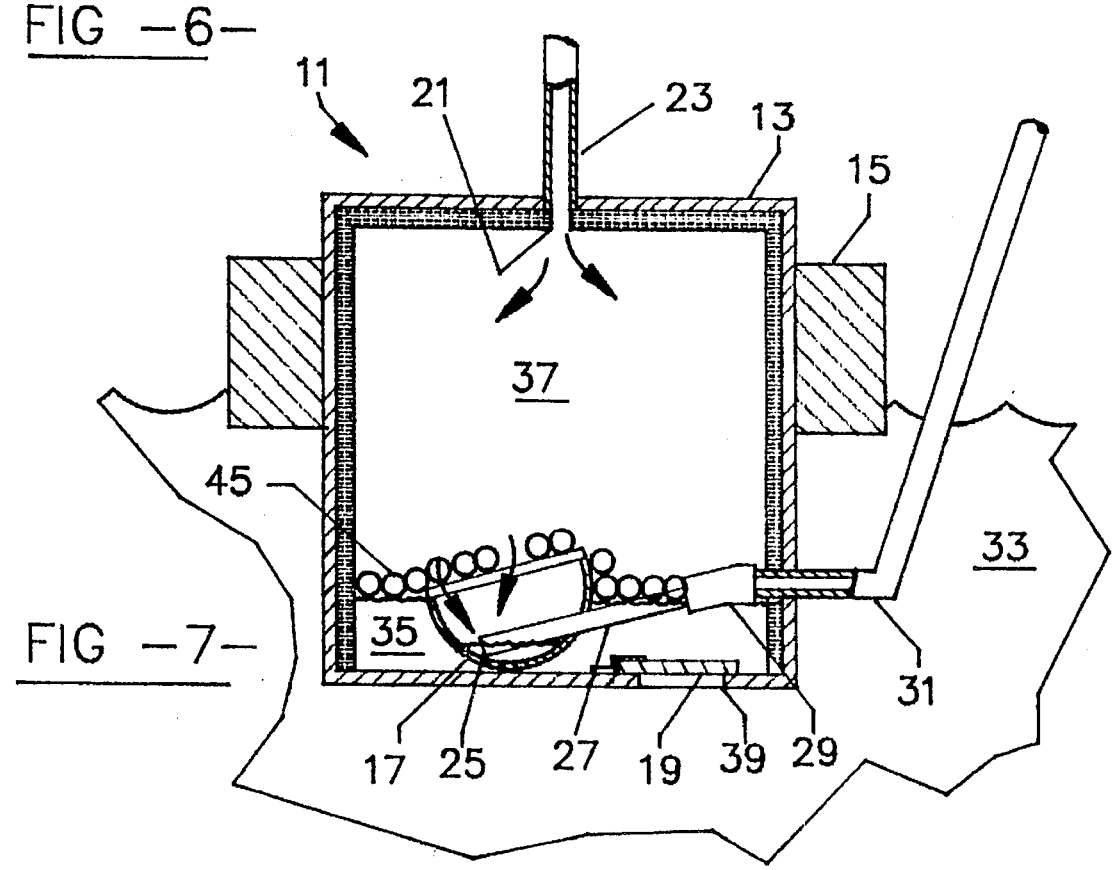
FIG -7-

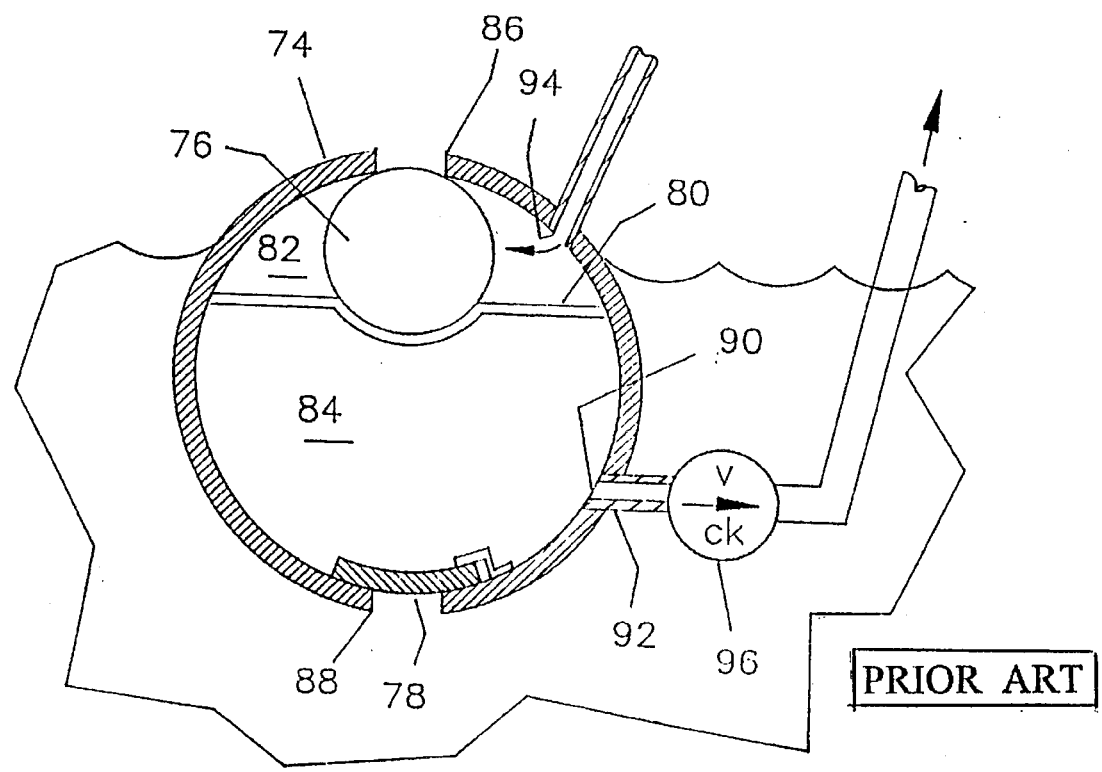
PRIOR ART
FIG -8-
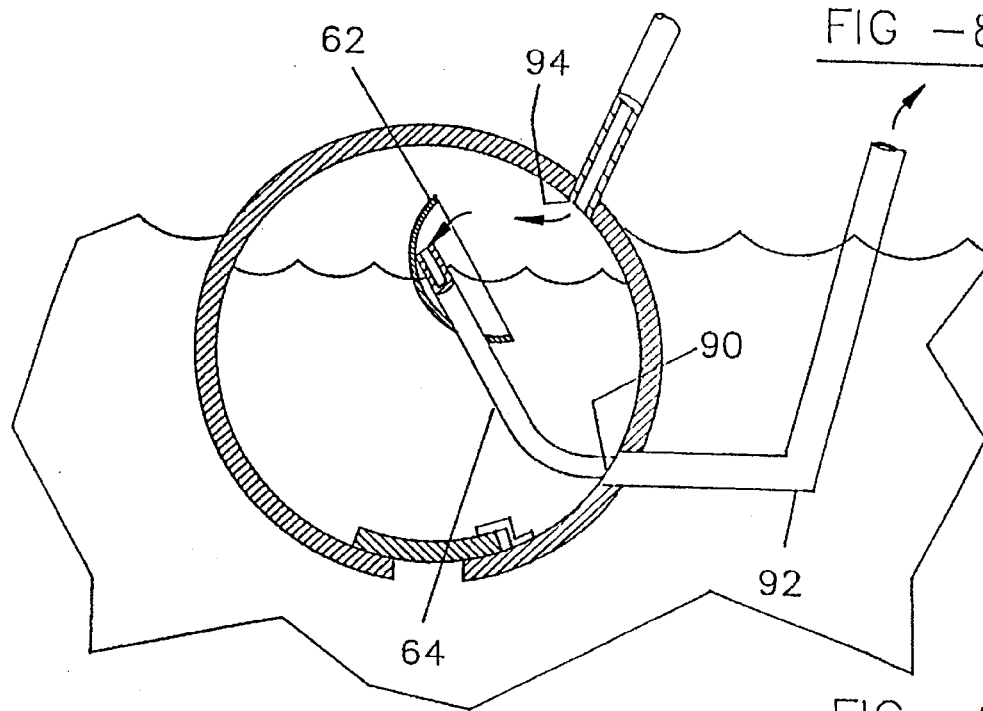
FIG -9-

PRESSURIZED GAS DRIVEN LIQUID PUMP HAVING THE OUTLET PIPE CONNECTED TO A VARIABLE BUOYANT FLOAT

BACKGROUND OF THE INVENTION

1. Field of the Invention

This invention relates generally to pumps, and more particulaly to pumps powered by expansion of a gas and/or steam This invention relates to improvements of an existing patent described in U.S. Pat. No. 4,469,472, of Newby.

2. Description of Prior Art

One of the first of many devices that used the power of expanding gas was built by Hero of Alexandria in the first century of the Christian era. He invented a solar siphon that could transfer water from one container to another when it was placed in the sun. Solar energy heated air inside a sealed chamber; the heated air expanded and exerted pressure on the water inside the chamber, forcing it out In the mid-nineteenth century, Mouchot designed a solar pump including a sealed, copper cylinder partially filled with water, and a parabolic reflector for focusing sunlight on the cylinder. As the air expanded the water was forced from the cylinder through a one way check valve. A more modem example of a solar pump is found in U.S. Pat. No. 3,972,651 of Fletcher. The pump includes a hermetically sealed enclosure floating on a reservoir of water. The enclosure includes a solar heated chamber and a cooling chamber that communicates through a plurality of heat sinks. At the bottom of the enclosure 11 there is a sump which is in communication with the reservoir of water via a one way valve. When the air in heated chamber expands it will flow through the heat sinks into the cooling chamber and exert pressure on the water in sump to force it up a conduit to an output flume. Flecher's device is metered by a tipple which is filled by dribbles of water from the flume. When the tipple is filled with water it will tip over, raising a 'displacer' which separated the chambers and. This cools the air with in the enclosure and causes water to flow into the sump through valve. When the tipple empties the dispalcer falls and the cycle is repeated.

Flechers's device is an example of a closed system solar pump, that is, the same air is used over and over during the expansion and compression cycles and is never vented to the atmosphere. As such, Flecher's pump has many points of similarity with the Stirling hot air engine, which is a classic example of a closed system heat engine. A problem with a closed system pumps or engines is that their design is complicated by the need for complete pressure integrity, and by the elaborate heat dissipating mechanism required to cool the air between cycles. For example, most of the complexity in Flecher's device is found in the displacer and tipple mechanism which cools the air within the enclosure. Similarly, a Stirling hot air engine requires water jackets around the compression cylinder and/or an elaborate array of heat radiating fins.

A modem example of an open system pump is found in U.S. Pat. No. 4,469,472 of Newby. In FIGS. 5 and 6 of this patent a simplified version of an open system pump is shown. It is shown to include a hollow enclosure, a float disposed within the enclosure, and a flapper type check valve. The enclosure is provided with an upper orifice, a lower orifice and an output orifice. A check valve is coupled to an output pipe leading from the output orifice. An upper surface of float seats against upper orifice to seal the upper end of the enclosure Happer valve seals the lower orifice whenever the pressure within is greater than the water pressure outside of it. The operation of this embodiment is described as follows: As heat impinges the outer surface of enclosure the air within the enclosure expands and drives the water out of the enclosure. As the enclosure empties it will become more buoyant and will rise in the reservoir, and simultaneously the float will become less buoyant and will sink within the enclosure. When the upper orifice is unsealed, the hot, pressurized air within the enclosure will escape, and flapper valve will open to allow the enclosure to partially sink to its original or starting position.

The main question regarding the function of this design is the problem of maintaining a seal with the upper orifice. Air borne dust could easily corrupt the sealing surface of the orifice or, chemical corrosion from the water could corrode the float sealing surface. Either or both contaminates could make this device inoperable.

Another problem with this design (see FIG. 7 of U.S. Pat. No. 4,469,472) is that it can not function if the upper part of the chamber, that is, the part above the membrane, fills with fluid.

SUMMARY OF INVENTION

The purpose of this invention is to improve an existing invention so that it will operate more efficiently. The improvements are to modify invention described in U.S. Pat. No. 4,469,472, FIG. 7 of Newby. A brief description of the changes, as shown in FIG. 8 and 9 are as follows: In FIG. 8 The diaphragm 80 is removed, the check valve 96 is removed, the upper gas orifice 86 is removed, the cycling float 76 is removed and modified. It becomes a cycling container 62 a length of flexible tube 64 is united with the cycling container. In FIG. 9, The opposite end of tube 64 is coupled to existing output orifice 90. The object of the improvements is to provide a pump that is very inexpensive to construct and is powered by the expansion force of a gas or water vapor (steam) and air.

Briefly, the invention includes a hollow chamber, with a hollow cycling container, open at the top, disposed within the chain her. The cycling container is coupled to a flexible tube which is coupled to the output orifice near bottom of the chamber wall. This tows communication between the cycling container and the outside pipe. When the cycling container is empty it becomes buoyant. Whenever the cycling container is buoyant the pressurized gas within the chamber will escape. Whenever the cycling container is submerged the gas entering through the input pipe will be contained and the pressure within the chamber will rise until it forces water out of the output pipe. The circular arc distance the cycling container can travel upward is determined by the length of the flexible tube attached. Whenever the cycling container is raised to the level the tube length will allow, the container will have been rotated into a position that allows water to enter it, the container losses its buoyancy and sinks to the bottom of the chamber. Once again the cycling container is submerged and the gas entering the chamber through the input pipe is again captured.

An advantage of the present invention is that it is an open system mechanism, i.e. the gas and/or steam is vented to the atmosphere between each cycle. This design allows for simplified construction and reduces the need for radiators and/or other cooling mechanism another advantage of this present invention is that unique design of a cycling container that utilizes the forces of buoyancy and gravity to recycle the system.

Another advantage of this present invention is that it can function with only one valve, limiting the number of moving parts.

The consauction of the chamber with coiled tubing construction and the refilling of the chamber through this tubing will aid in lowering the temperature inside the chamber.

The simple embodiments of this invention would not require any machining.

The force required to pump the water can be increased by the addition of an attached tank to the chamber, which increases the area as indicated in the pressure formula P=F/A, it follows F=P×A. Therefore an increase in area will increase the force available to move the liquid, it also increases the amount of liquid to be moved each cycle.

Another advantage of the present invention is that it can function within a wide range of temperatures, from near freezing to above boiling.

Still another advantage of the present invention, it can function with the entire chamber submerged beneath the surface of the reservoir.

BRIEF DESCRIPTION OF THE DRAWING

FIG. 1 is an elevational view of a preferred embodiment of the present invention.

FIG. 2 is across section taken along line 2—2 of FIG. 1

FIG. 3 is a partial cross section of the coiled tubing construction and vent tubing connection FIG. 4 is a cross taken along line 2—2 of FIG. 1 with the pump in the refilling position of its cycle.

FIG. 5 is a partial cross sections of an alternate embodiment of the present invention.

FIGS. 6 and 7 are partial cross sections of an alternate embodiment of the present invention.

FIG. 8 is a duplication of FIG. 7 of U.S. Pat. No. 4,469,472, of Newby.

FIG. 9 indicates the improvement modifications that have been incorporated into U.S. Pat. No. 4,469,472.

| 1 | REFERENCE NUMERALS | | 29 | | |
|---|---|---|---|---|---|
| 2 | IN DRAWINGS | | 30 | | |
| 3 | FIGS 1, 2 and 4 | | 31 | FIG 3 | |
| 4 | 10 | assembly | 32 | 30 | tubing |
| 5 | 12 | enclosure | 33 | 32 | vent tube |
| 6 | 14 | adjustable float | 34 | FIG. 5 | |
| 7 | 16 | chamber | 35 | 10a | assembly |
| 8 | 18 | cycling container | 36 | 12a | cycling container |
| 9 | 20 | gas input pipe | 37 | 14a | reservoir |
| 10 | 22 | not used | 38 | 16a | chamber |
| 11 | 24 | input orifice | 39 | 18a | outlet orifice |
| 12 | 26 | flapper valve, | 40 | 20a | gas input pipe |
| 13 | 28 | reservoir water | 41 | 22a | one way valve |
| 14 | 30 | chamber tubing | 42 | 24a | outlet pipe |
| 15 | 32 | vent tubing | 43 | 26a | flapper valve, |
| 16 | 34 | inside chamber | 44 | 28a | reservoir water |
| 17 | 36 | water inlet orifice | 45 | 30a | swivel joint |
| 18 | 38 | water inlet pipe | 46 | 32a | vent tube |
| 19 | 40 | output pipe | 47 | 34a | inside chamber |
| 20 | 42 | water output pipe | 48 | 36a | inlet orifice |
| 21 | 44 | swivel joint | 49 | 38a | water inlet pipe |
| 22 | 46 | not used | 50 | 40a | tank |
| 23 | 48 | output orifice | 51 | 42a | chamber water |
| 24 | 50 | chamber water | 52 | 44a | chamber air |
| 25 | 52 | chamber gas | 53 | 46a | tank water |
| 26 | 54 | tube end | 54 | 48a | tank air |
| 27 | 56 | not used | 55 | 50a | water tube |
| 28 | 58 | gas inlet orifice | 56 | 52a | air tube |
| 1 | 54a | earth | 29 | FIG 8 and 9 | |
| 2 | 56a | not used | 30 | 60 | not used |

| 3 | 58a | inlet orifice | 31 | 62 | cycling container |
|---|---|---|---|---|---|
| 4 | 60a | chamber tube | 32 | 64 | flexible tube |
| 5 | 62a | tube end | 33 | 66 | not used |
| 6 | | | 34 | 68 | not used |
| 7 | FIGS 6 and 7 | | 35 | 70 | not used |
| 8 | 11 | assy | 36 | 72 | not used |
| 9 | 13 | chamber | 37 | 74 | enclosure |
| 10 | 15 | adjustable float | 38 | 76 | cycling float |
| 11 | 17 | cycling | 39 | 78 | flapper valve |
| 12 | 19 | flapper valve | 40 | 80 | diaphragm |
| 13 | 21 | gas input orifice | 41 | 82 | chamber air |
| 14 | 23 | gas inlet pipe | 42 | 84 | water chamber |
| 15 | 25 | water outlet orifice | 43 | 86 | upper gas orifice |
| 16 | 27 | output pipe | 44 | 88 | water orifice |
| 17 | 29 | flexible tube joint | 45 | 90 | outlet orifice |
| 18 | 31 | output tube | 46 | 92 | outlet pipe |
| 19 | 33 | reservoir water | 47 | 94 | gas inlet orifice |
| 20 | 35 | chamber water | 48 | 96 | one way valve |
| 21 | 37 | chamber air | 49 | | |
| 22 | 39 | water inlet orifice | 50 | | |
| 23 | 41 | screen | 51 | | |
| 24 | 43 | insulation | | | |
| 25 | 45 | insulation beads | | | |

DETAILED DESCRIPTION OF THE PREFERRED EMBODIMENT(S)

Referring to FIGS. 1–4. A pump mechanism 10. In accordance with the present invention includes an enclosure 12, a enclosure float 14, chamber 16, a cycling container 18, a gas input pipe 20, a reservoir outlet pipe 40, provided with a one way water valve 26. Referring more particulaly to FIG. 2, the enclosure 12 is a hollow cylinder, but it can be made in any suitable shape. The enclosure float 14 can also be made in any suitable shape. The enclosure 12 is provided with one orifice 24 allowing communication between the reservoir water 28 and the water valve 26 through output pipe 40 . The chamber 16 partly constructed from continuous coiled tubing 30 is vented at the inside top of the chamber. The chamber is a domed cylinder but can be made in any appropriate shape that is suitable for drainage. The vent 32 location to be determined such that only gas or steam will vent. The chamber 16 is preferably provided with three orifices, allowing communication between the internal chamber 34, namely a gas orifice 58, a water input orifice 36 connected to input pipe 38, an output orifice 48 associated with water output pipe 42. Output pipe 42 connected to swivel coupling 44. Output pipe 42 is connected to cycling container 18. The output pipe end 48 located within the cycling container to be positioned so as to evacuate the maximum container water 50 when the cycling container is resting on the bottom of chamber. The end of the continuous tubing end 54 so located such that flow of incoming water is below the mouth of the cycling container.

The operation of the present invention will be discussed with reference to FIGS. 1–4. The beginning of the cycle is shown in FIG. 2. The depth the enclosure sets in the reservoir water 28 is determined by an adjustable float 14 attached to the outside of the enclosure. A source of presurized gas or stream enters the chamber 16 through the input pipe 20 and exerts a force upon the surface of the chamber water. The chamber water 50 is forced out of the chamber through the end of the output tube end 48 located within the cycling container. When the chamber water has been lowered to a level determined by the cycling container 18 location, water is then forced out of the cycling container until it is nearly empty. At this point the pressurized gas vents itself through the output robe 42. The chamber pressure is lowered nearly to atmospheric pressure. The reservoir water pressure is now greater than the inner chamber pressure. The flapper valve 26 connected to the reservoir opens, and water flows into the top of the chamber, through a domed structure of cooling coils of robing, it continues to flow downward through a wall of cooling coils add into the bottom of chamber The cycling container, now buoyant, rises as the chamber refills. The cycling container, because of its attachment the output robe and to the flexible joint near the lower chamber wall, travels in a vertical circular arc as the water moves upward. At a predetermined point the cycling container will began to fill with water, and when partially filled it is no longer buoyant. It sinks to the bottom of the chamber. The pressurized gas can no longer vent to the atmosphere. The vent in the cooling wall coil allows the water in them and the chamber to reach the same level. The pressurized gas 52 now contained begins to exert pressure on the sin:face of the chamber water. The cycle repeats.

Referring to FIG. 5 A second embodiment of a pump mechanism modified to function as a land based operation near a reservoir. In accordance with the present invention includes, a chamber 16a, 40a. The chamber and tank are joined by air tube 52a and water tube 50a allowing combining of chamber water 42a with tank water 46a and chamber gas 44a with tank gas 48a, a cycling container 18a, located within the chamber allows water and gas to escape as the system cycles, a pressurized gas input 20 a provided with a one way check valve 26a, which allows gas into the chamber.

Referring more particularly to FIG. 5, one inlet orifice 58a allowing communication between the reservoir water 28a and the water valve 26a. The chamber 16a pretty constructed from continuous coiled tubing 60a is vented at the inside top of the chamber. The chamber is a domed cylinder but can be made in any suitable shape that will drain. The vent 32a location to be determined such that only gas will vent. The chamber 16a is provided with three additional orifices, allowing communication with the inside of the chamber 34a, namely a gas orifice 56a, a water input orifice 58a associated with input pipe 38a, and water valve 26a, an output orifice 18a associated with output pipe 24a. Output pipe 24a connected to swivel coupling 30a. Output pipe 24a is connected to cycling container 12a. The output end 18a located within the cycling container to be located so as to evacuate the maximum container water 42a when the cycling container is resting on the bottom of the chamber. The end of the continuous tubing, tube end 62a, so located such that flow of incoming water is below the cycling container's upper opening.

The operation of the present invention will be discussed with reference to FIGS. 5 A source of pressurized gas or steam enters the chamber 16a and tank 40a through the input pipe and exerts a force upon the surface of the chamber water 42a and tank water 46a. The tank increases the effective area that the pressurized gas can act upon and it also increases the volume of liquid that can be moved each cycle. The chamber water 50a is forced out of the chamber through the end of the output tube orifice 18a located within the cycling container. When the chamber water and the tank water have been lowered to a level determined by the cycling container 18a location, water is then forced out of the cycling container until it too is nearly empty. At this point the pressurized gas vents itself through the output tube. The chamber pressure is lowered nearly to atmospheric pressure. The reservoir water pressure is now greater than the inner chamber pressure. The flapper valve 26a connected to the reservoir opens, and water flows into the top of the chamber, through a domed structure of cooling coils of tubing, it continue to flow downward through a wall of cooling coils and into the bottom of chamber and tank. The cycling container, now buoyant, rises as the chamber and tank refill. The cycling container, because of its attachment the output tube and to the flexible joint near the lower chamber wall, travels in an vertical circular arc. At a predetermined point the cycling container will begin to fill with water, and when partially filled it is no longer buoyant. It sinks to the bottom of the chamber. The pressurized gas can no longer vent to the atmosphere. The vent in the coils lows the water in them and the chamber to reach the same level. The pressurized gas, now contained, begins to exert pressure on the surface of the chamber water. The cycle repeats.

In FIGS. 6 and 7, a simplified alternate embodiment of the invention 11 include a hollow chamber 13, lined with insulation 43 to minimize heat loss, the chamber water 35 has a layer of insulation beads 45 covering its surface to reduce heat loss to the water. A cycling container 17, a screen 41 covering open diameter of the cycling chamber to prevent the insulation beads from entering the cycling container. A output pipe 27 coupled to cycling container 17, and to flexible tube joint 29, the tube joint is in turn coupled to the output pipe 31. Chamber 13 includes a gas inlet orifice 21 coupled to gas inlet pipe 23 leading to a pressurized gas source. A water inlet orifice 39 associated with a flapper valve 19. An adjustable float 15, attached to chamber 13. The float location determines water level within the chamber.

In operation, when the cycling container 17 is submerged, the gas source 37 exerts a pressure on the water 35 within the chamber. Water is expelled from the chamber, through the robe end 25 located within the cycling container 17. The pressurized gas 37 is also expelled through the tube end 25. When the cycling container 17 is empty it becomes buoyant, and the pressure within the chamber is near atmospheric, as the pressurized gas vents to the atmosphere through tube end 25. The greater pressure of the reservoir water 33 opens the flapper valve 19 and the chamber 13 refills the cycling container 17, now buoyant, rises as the chamber refills. The cycling container will continue to rise in a vertical circular arc until its path rotates it into a predetermined point where it will take in water, when partially filled it is no longer buoyant. It sinks to the bottom of the chamber. The pressurized gas can no longer vent to the atmosphere and the gas pressure again builds up within the chamber.

While this invention has been described in terms of a few preferred embodiments, it is contemplated that persons reading the proceedings descriptions and studying the drawings will realize various alterations, permutations and modifications thereof. It is therefore intended that the following appended claims be interpreted as including all such alterations, permutations and modification as fall within the true spirit and scope of the present invention.

What is claimed is:

1. A pump mechanism adapted to float on the surface of a liquid, said liquid interfaced with a source of pressurized gas or steam, said pump mechanism comprising:

(a) a enclosure provided with a float and with a chamber, said chamber further having an upper surface with inlet means coupled to said source for allowing flow of pressurized gas into the chamber, a gas input pipe permitting communication between said pressurized gas source and said chamber, a liquid orifice permitting communication between said liquid reservoir and said chamber, a hollow cycling container, buoyant when empty, coupled to output orifice with said orifice permitting communication between said cycling container and said output pipe;

(b) said cycling container, located within said chamber; adapted to sink when said liquid rises above a predetermined level;

(c) first swivel joint means coupled to said cycling container and output pipe to allow vertical circular arc travel of said cycling container, as liquid rises, or said cycling container sinks;

(d) first check valve means associated with said liquid orifice to allow one way flow of liquid into said chamber; and (e) the chamber formed of a continuous coiled robe ceiling and walls, an upper side of the walls including a vent to allow drainage.

2. A land based pump mechanism adapted to be located at a distance and at a predetermined elevation from a reservoir of liquid and connected to a said source of pressurized gas, said pump mechanism comprising:

(a) a chamber having an upper surface coupled to said source said chamber further having an upper surface with inlet means coupled to said source for allowing flow of said pressurized gas into the chamber, a liquid orifice permitting communication between said liquid reservoir and said chamber, a hollow cycling container, buoyant when empty, coupled to output orifice with said output office permitting communication between said cycling container and an output pipe;

b) said cycling container, located within said chamber and adapted to sink when said liquid rises in said chamber above a predetermined level;

(c) first swivel joint means coupled to said cycling container and output pipe to allow vertical circular arc travel of said cycling container as liquid rises, or said cycling container sinks;

(d) first check valve means associated with said liquid orifice to allow one way flow of liquid into said chamber;

(e) the chamber formed of a continuous coiled tube ceiling and walls, an upper side of the walls including a vent to allow drainage, and (f) second check valve means associated with said gas input pipe to allow one way flow of gas into said chamber.

3. A pump mechanism as recited in claim 2, further comprising a tank coupled to said chamber permitting communication of said liquid and said gas between said chamber and said tank.

4. A pump mechanism adapted to float on the surface of a liquid, said liquid interfaced with a source of pressurized gas or steam, said pump mechanism comprising:

(a) a chamber provided with a float, said chamber further having an upper surface coupled to said source, a lower surface exposed to said liquid reservoir, a gas input tube permitting communication between said pressurized gas source and an internal chamber liquid orifice permitting communication between said liquid reservoir and said chamber, a hollow cycling container buoyant when empty, coupled to an output orifice with said output orifice permitting communication between the cycling container and an output pipe located at a lower side of said chamber;

(b) said cycling container, located within said chamber and adapted to sink when said liquid rises in said chamber above a predetermined level, (c) first swivel joint means coupled to said cycling container and output pipe to allow vertical circular arc travel of said cycling container as liquid rises, or said cycling container sinks;

(d) first check valve means associated with said liquid orifice to allow one way flow of liquid into said chamber; and (d) Inlet means coupled to said chamber, and a said source of pressurized gas and/or steam coupled so said source pressurized gas may flow into said chamber.

5. A pump mechanism as recited in claim 4, further comprising said chamber insulated with buoyant insulating beads on a surface of chamber liquid, and said chamber lined with insulation down to a floor of said chamber, said cycling container capped with a porous screen to prevent migration of said insulation beads into said cycling container.

* * * * *